United States Patent
Knappe et al.

[11] Patent Number: 5,985,146
[45] Date of Patent: Nov. 16, 1999

[54] SANITARY RIGID SHELL SPIRAL WOUND ELEMENT

[75] Inventors: Peter Herbert Knappe, Santa Barbara; Daniel Franklin Quigg, Ventura; Ronald Paul Magnani, Goleta, all of Calif.

[73] Assignee: TriSep Corporation, Goleta, Calif.

[21] Appl. No.: 08/899,182

[22] Filed: Jul. 23, 1997

[51] Int. Cl.[6] .................................................. B01D 63/00
[52] U.S. Cl. .............................. 210/321.83; 210/493.4; 210/497.01; 210/497.1
[58] Field of Search .................... 210/321.83, 493.4, 210/197.01, 497.1

[56] References Cited

U.S. PATENT DOCUMENTS

| | | |
|---|---|---|
| 2,354,645 | 8/1944 | Bateman . |
| 3,240,344 | 3/1966 | Hoelscher ................................ 210/340 |
| 3,272,336 | 9/1966 | Humbert, Jr. ............................ 210/132 |
| 3,317,051 | 5/1967 | Ranhagen et al. ...................... 210/332 |
| 3,367,504 | 2/1968 | Westmoreland . |
| 3,398,834 | 8/1968 | Nuttall et al. ............................ 210/321 |
| 3,417,870 | 12/1968 | Bray . |
| 3,442,002 | 5/1969 | Geary, Jr. et al. ........................ 29/450 |
| 3,493,496 | 2/1970 | Bray et al. . |
| 3,504,796 | 4/1970 | Bray . |
| 3,567,632 | 3/1971 | Richter et al. . |
| 3,597,393 | 8/1971 | Bach et al. . |
| 3,615,024 | 10/1971 | Michaels . |
| 3,669,879 | 6/1972 | Berriman . |
| 3,738,492 | 6/1973 | Trillich ................................... 210/196 |
| 3,807,568 | 4/1974 | Ruthrof .................................. 210/304 |
| 3,839,201 | 10/1974 | Miller . |
| 3,898,158 | 8/1975 | MIller . |
| 3,928,204 | 12/1975 | Thomas .................................. 210/232 |
| 3,951,815 | 4/1976 | Wrasidlo . |
| 3,966,616 | 6/1976 | Bray . |
| 4,001,198 | 1/1977 | Thomas . |
| 4,036,760 | 7/1977 | Bardonnet et al. . |
| 4,039,440 | 8/1977 | Cadotte . |
| 4,049,550 | 9/1977 | Obidniak ................................. 210/152 |
| 4,235,723 | 11/1980 | Bartlett, Jr. . |
| 4,277,344 | 7/1981 | Cadotte . |
| 4,301,013 | 11/1981 | Setti et al. .............................. 210/637 |
| 4,399,035 | 8/1983 | Nohmi et al. . |
| 4,402,830 | 9/1983 | Pall ........................................ 210/457 |
| 4,421,646 | 12/1983 | Correge et al. ......................... 210/291 |
| 4,451,369 | 5/1984 | Sekino et al. ......................... 210/321.1 |
| 4,494,603 | 1/1985 | Harguindey ............................ 166/231 |
| 4,548,714 | 10/1985 | Kirwan, Jr. et al. .................... 210/232 |
| 4,689,152 | 8/1987 | Liang ..................................... 210/649 |
| 4,693,835 | 9/1987 | Arai ....................................... 210/777 |
| 4,741,841 | 5/1988 | Borre et al. ............................ 210/785 |
| 4,783,259 | 11/1988 | Wade ..................................... 210/169 |
| 4,839,037 | 6/1989 | Bertelsen et al. . |
| 4,906,372 | 3/1990 | Hopkins ............................... 210/321.74 |
| 4,990,248 | 2/1991 | Brown et al. .......................... 210/136 |
| 5,043,067 | 8/1991 | Sorensen ............................. 210/321.8 |
| 5,071,552 | 12/1991 | Bikson et al. ........................ 210/321.8 |
| 5,128,028 | 7/1992 | Lamort .................................. 209/397 |
| 5,128,037 | 7/1992 | Pearl et al. .......................... 210/321.74 |
| 5,176,725 | 1/1993 | Puri et al. ............................... 55/158 |
| 5,255,791 | 10/1993 | Lamort .................................. 209/406 |
| 5,288,308 | 2/1994 | Puri et al. ................................. 96/8 |
| 5,490,926 | 2/1996 | Hammeken . |

Primary Examiner—W. L. Walker
Assistant Examiner—Michael Fleming
Attorney, Agent, or Firm—Christie, Parker & Hale, LLP

[57] ABSTRACT

A novel rigid, nonporous shell for use with a spiral wound membrane filtration element that allows a controlled bypass flow between the outside of the element and the inside of an enclosing pressure housing while maintaining structural mechanical properties and tight tolerances on the outside diameter of the element allowing easy installation and removal of the cartridge.

19 Claims, 4 Drawing Sheets

SANITARY RIGID SHELL SPIRAL WOUND ELEMENT

FIELD OF THE INVENTION

This invention relates to a spiral wound filtration cartridge used in fluid separation applications such as ultrafiltration, microfiltration, nanofiltration, and reverse osmosis. Specifically, this invention relates to a spiral wound filtration cartridge capable of providing a partial but controlled feed bypass flow that prevents fluid stagnation within and around the cartridge during use.

BACKGROUND OF THE INVENTION

Membrane elements have long been regarded as efficient devices for separating components of fluid mixtures using, for example, ultrafiltration, microfiltration, nanofiltration and reverse osmosis processes. In a typical implementation, a pressurized fluid mixture is brought into contact with a membrane surface. Because of a difference in chemical potential and due to varying mass transport rates through the membrane, only some parts of a fluid mixture can pass through the membrane and a separation into constituent components is achieved.

In a typical spiral wound filtration cartridge, membrane sheets are wound around a centrally positioned porous tube. The fluid mixture, or feed, enters at one end of the cylindrical cartridge and travels through feed spacers positioned parallel to and between the membrane sheets. Separation occurs at the membrane-fluid interface; part of the fluid, called the permeate, passes through the membrane layer while the rest of the mixture remains on the opposite side of the membrane as more highly concentrated feed. The permeate stream travels in an inwardly spiraling radial direction until it passes through the walls of the central tube for recovery from one or both ends of the central tube. (see U.S. Pat. Nos. 4,235,723, 3,367,504, 3,504,796, 3,493,496, and 3,417,870.)

These spiral wound filtration cartridges are typically placed in a fiberglass or stainless steel pressure housing that provides mechanical strength to withstand the high feed pressures required for operation. It is undesirable for feed to flow uncontrolled through the annular space between the cartridge and the pressure housing because such uncontrolled bypass flow reduces the volume of feed fluid that is forced through the filtration element. This has two negative results: First, it reduces the volume of feed fluid that can be filtered on any one use of the filtration device. Second, the decreased feed flow reduces the hydrodynamic turbulence within the membrane filter and thus decreases the salt rejection efficiency. One method for preventing such bypass flow is to use brine seals to seal the outside of the cartridge to the inside of the pressure housing. However, an area of stagnant water can form in the annular space behind these brine seals and bacteria may grow in this stagnant water. Bacterial growth is unacceptable in sterile applications, such as applications involving food or medicine, in which these filters are sometimes used.

It has been proposed to provide a controlled bypass flow of feed within the annular space to prevent this bacterial growth. U.S. Pat. No. 4,301,013 discloses the use of a tight fitting open mesh within the annular space to control the bypass flow. It has also been proposed in U.S. Pat. No. 4,548,714 to wrap the cartridge with a leaf of feed spacer to provide for controlled fluid flow around the cartridge. U.S. Pat. No. 4,906,372 discloses a seamless porous rigid sleeve around the cartridge which separates the cartridge from the housing and provides a small, controlled bypass flow. All of these proposals require devices which must be manufactured within precise tolerances to provide a tight fit within the housing. Precise tolerances are difficult to produce with the materials and designs suggested in these patents. Extra-precision in manufacture is required to produce a user-friendly interchangeable cartridge. Further, none of the proposals provides mechanical support for the cartridge, which could be useful due to the high differential pressure which can develop within the pressure housing.

U.S. Pat. No. 5,128,037 describes a rigid shell surrounding the filtration cartridge that is sealed from the housing with a brine seal and which allows a small amount of impeded bypass flow through small holes or passageways. This design utilizes a brine seal and a relatively large annular space which are both potential stagnant areas that encourage bacterial growth.

Accordingly, it would be desirable to provide a filtration cartridge construction which allows a controlled feed bypass, close tolerances to the inner diameter of the pressure housing, mechanical rigidity to withstand the differential pressure forces, and a sanitary design that eliminates the brine seal and all stagnant areas.

SUMMARY OF THE INVENTION

The present invention provides for a rigid shell that can house a spiral wound membrane element device whose outside surface has a close tolerance to the inside surface of the pressure housing, the outside surface of the shell having a corrugated or threaded design that allows for a small but controlled by-pass flow while minimizing the contact area between the pressure housing and the cartridge to allow for ease of installation and removal.

This new spiral wound element is of a sanitary construction that is suitable for dairy, food, pharmaceutical, or any other application where biological growth is a concern, while still maintaining a structural outer shell that can withstand the differential pressure forces that are developed in normal system operation.

BRIEF DESCRIPTION OF THE DIAGRAMS

DETAILED DESCRIPTION OF THE PREFERRED EMBODIMENT

Figure 1:
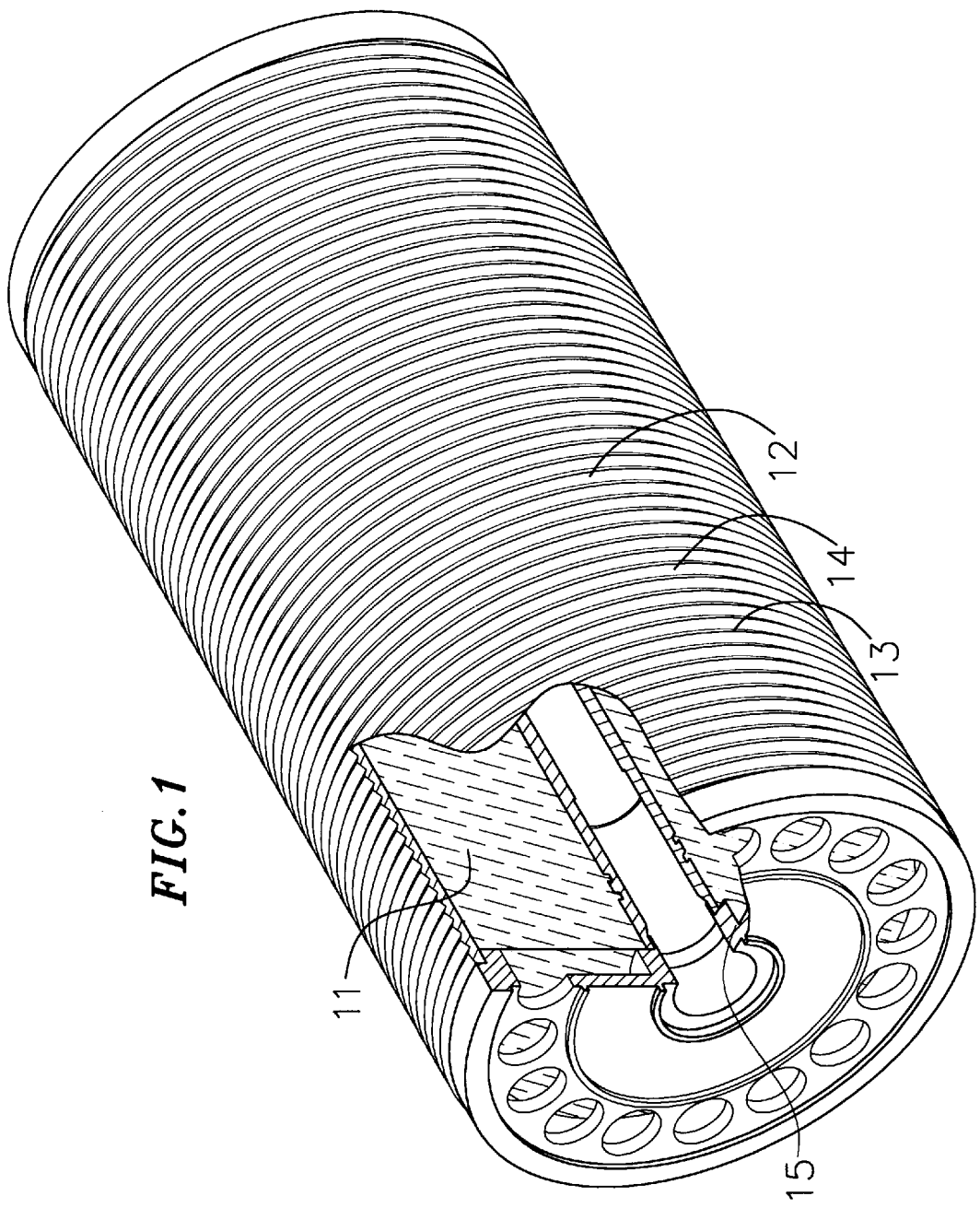
FIG. 1 shows a partially cut-away perspective view of one embodiment of the current invention, with a spiral wound filtration cartridge contained within a sanitary rigid shell.

In a preferred embodiment, depicted in FIG. 1, a spiral wound membrane filtration cartridge 11, a device well known in the art, is used to filter a feed fluid into its constituent parts. This substantially cylindrical cartridge 11 is inserted into a rigid, nonporous, substantially cylindrical shell 12. In the depicted embodiment, a threaded groove 13 runs around the circumference and down the length of the shell 12 in the substantially helical pattern depicted in FIG. 1. A narrow channel 14 created between adjacent instances of the groove provides a narrow, continuous passageway down the length of the rigid shell 12.

Anti-telescoping end-caps 15 are attached to the shell 12 and fused to the filtration cartridge 11 to prevent the cartridge 11 from telescoping when subjected to the high differential pressures that are used to force fluid through the filter.

Figure 2:
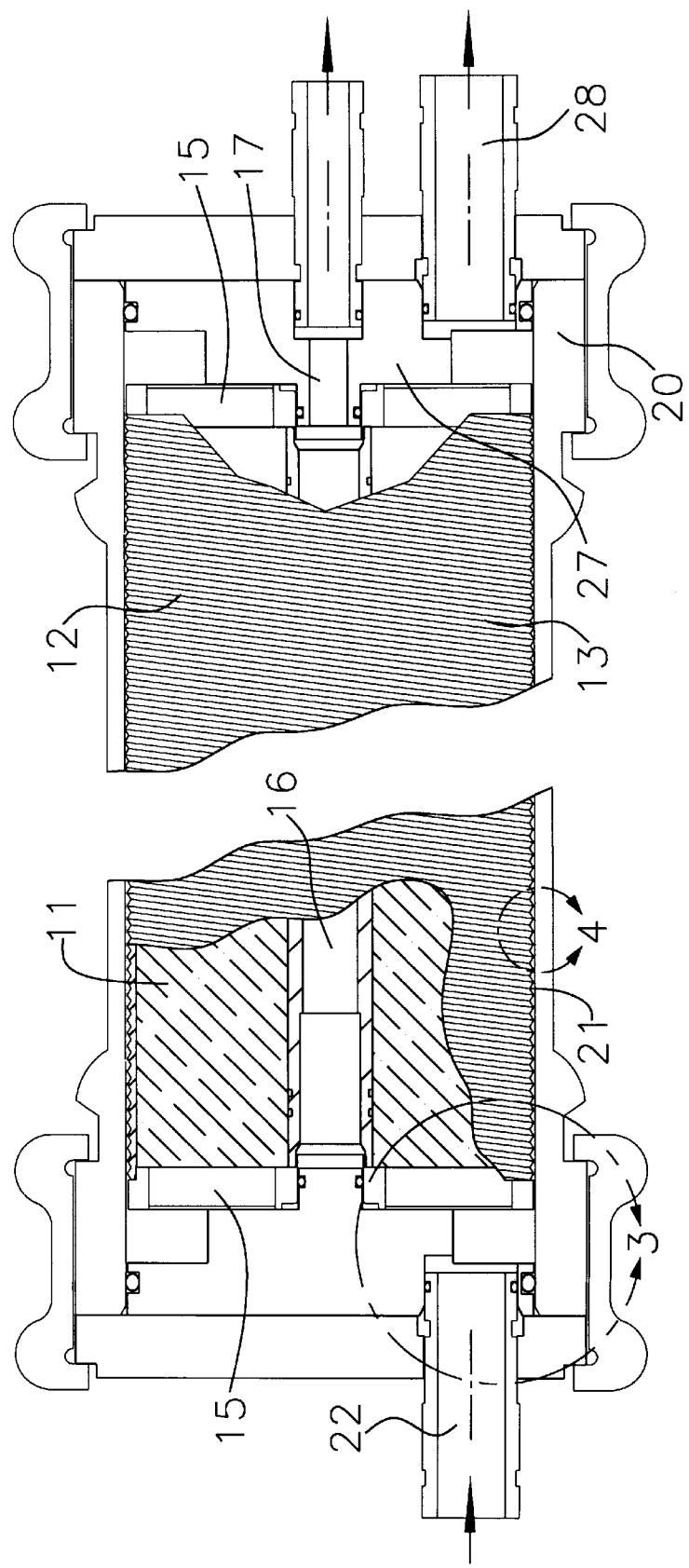
FIG. 2 shows a partially cut-away side view of the element detailed in FIG. 1 housed in a pressure housing.

Referring to FIG. 2 the assembled filtration device consisting of the threaded shell 12, filtration cartridge 11, and end caps 15 is depicted inside a pressurized housing 20. The shell 12 is manufactured to closely fit into the pressurized housing 20. Specifically, the threads 13 of the shell 12 either touch the interior wall 21 of the pressurized housing 20, or closely miss touching the interior wall 21. Despite the close fit between the shell 12 and pressurized housing 20, the shell 12 should not fit so tightly that insertion or removal of the shell 12 into the housing 20 is difficult.

Figure 3:
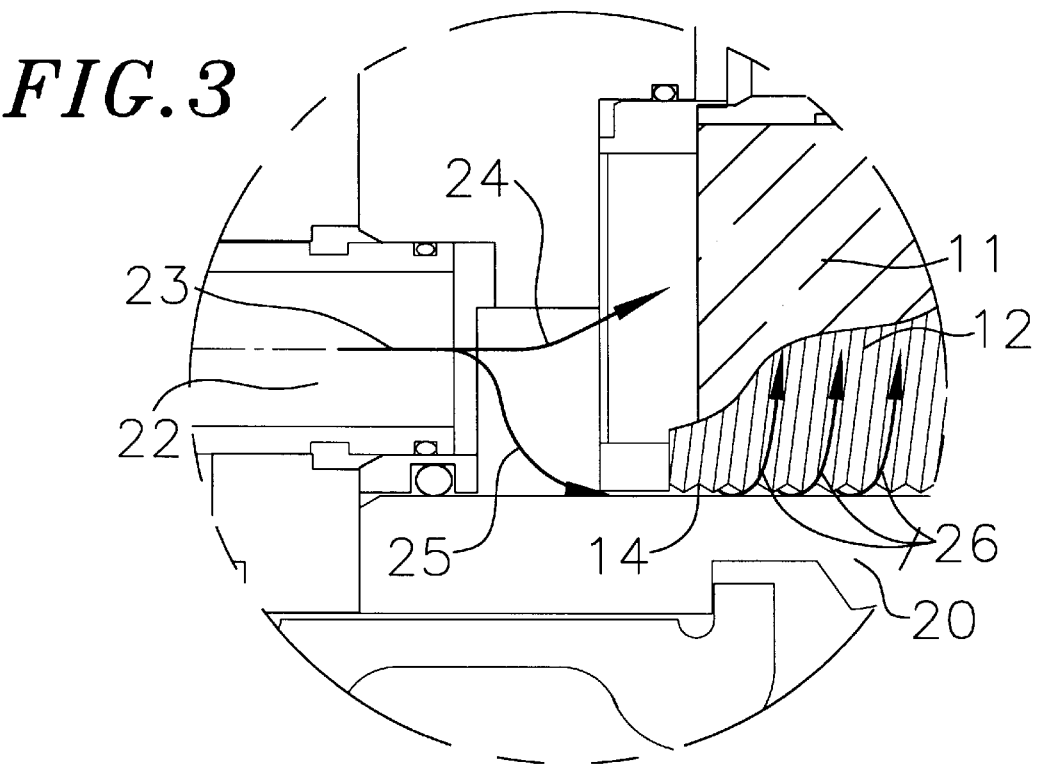
FIG. 3 shows a cut-away side view of the corner of the assembly of FIG. 2, and indicates the bypass flow path.

FIG. 3 is a closeup of the region of the filtration device near the input conduit 22, indicated in FIG. 2 as region 3. The incoming feed flow 23 is forced under pressure into the housing 20 through the input conduit 22. Most of the feed 24 flows into the filtration cartridge 11 for separation into constituent parts. A small percentage 25 of the total feed flow 23 bypasses the filtration cartridge 11 through the annular space between the shell 12 and the housing 20. This bypass flow enters the annular space substantially unimpeded and substantially unobstructed. There are no substantial obstructions that can create stagnant areas in the bypass flow, such as seals, brine seals, or other blocking devices, in the annular space or at the entrance to the annular space.

The majority of the bypass flow 25 enters the groove 14 formed by the helical thread 13 of the shell and moves down the length of the shell, following the groove 14 in a helical or corkscrew path 26. The groove 14 has high frictional losses limiting the amount of feed that can bypass the filtration cartridge 11. The turbulent and moving stream of fluid through the groove eliminates any dead or stagnant areas in the region near the inner wall of the pressurized housing.

Referring again to FIG. 2, the feed flow that enters the filtration cartridge 11 is separated by membrane layers into a more concentrated feed, or brine, and a purified fluid product, or permeate. The permeate flow spirals inward through the filtration device 11 and enters the central porous tube 16. This flow travels down the central tube 16 and exits the cartridge through output conduit 17 as a purified product. The concentrated brine exits the filtration cartridge 11 into region 23 and is forced through exit conduit 24 to be collected and refiltered.

Figure 4:
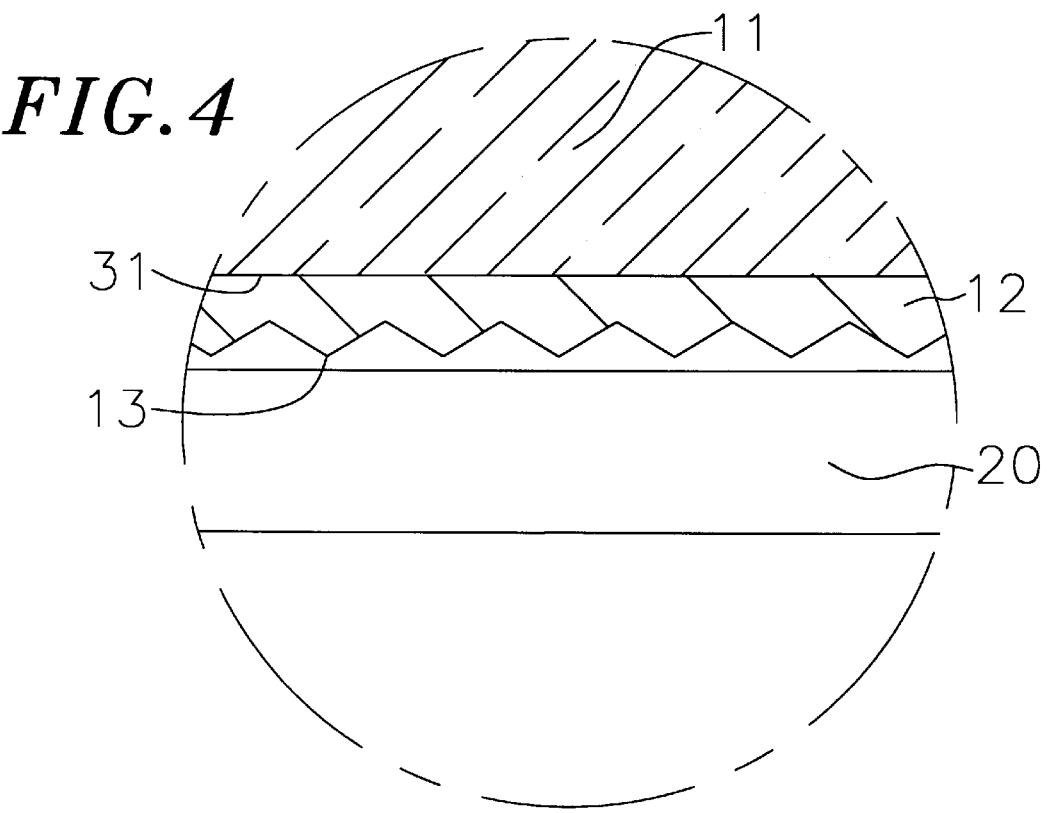
FIG. 4 shows a cross-sectional close-up side view of the edge of the assembly showing the relationship between the cartridge, pressurized housing, and rigid shell having a threaded surface.

FIG. 4 depicts a cross-sectional cut-away of the region specified in FIG. 2 as region 4. This view highlights the spatial relationship between the outer surface of the filtration cartridge 11 and the smooth inner surface 31 of the outer shell 12. In a preferred embodiment, the filtration cartridge 11 is manufactured to fit tightly within the outer shell but with an extra layer of feed-brine spacer between the inside of the outer shell and the outside of the element. This feed-brine spacer creates an annulus similar to that between the membrane surfaces and eliminates any potential fluid stagnancy on the inside of the shell.

FIG. 4 also illustrates the spatial relationship between the threaded outer surface of the rigid outer shell 12 and the inner wall of the pressurized housing 20. As described above, the shell must be manufactured such that the threads 14 come into contact, or very nearly into contact, with the inner wall of the housing 20. If the threads 14 do not touch the wall of the housing 20, as in FIG. 4, a narrow annular space is formed between the threads of the shell 12 and the housing 20. Experience has shown that the shell 12 should be constructed so that this narrow annular space permits 10% or less, and preferably 5% or less, of the total feed flow to bypass the filtration cartridge 11.

A preferred embodiment of this invention would be a shell made from thermoplastics, themosets, or stainless steel. This shell could be machined or thermoformed from tubular extrusions, injection molded in a single or multi-piece configuration, or cast in a rotational or blow molding process. In the case of stainless steel, it could be cast or machined from a tubular extrusion.

Figure 5:
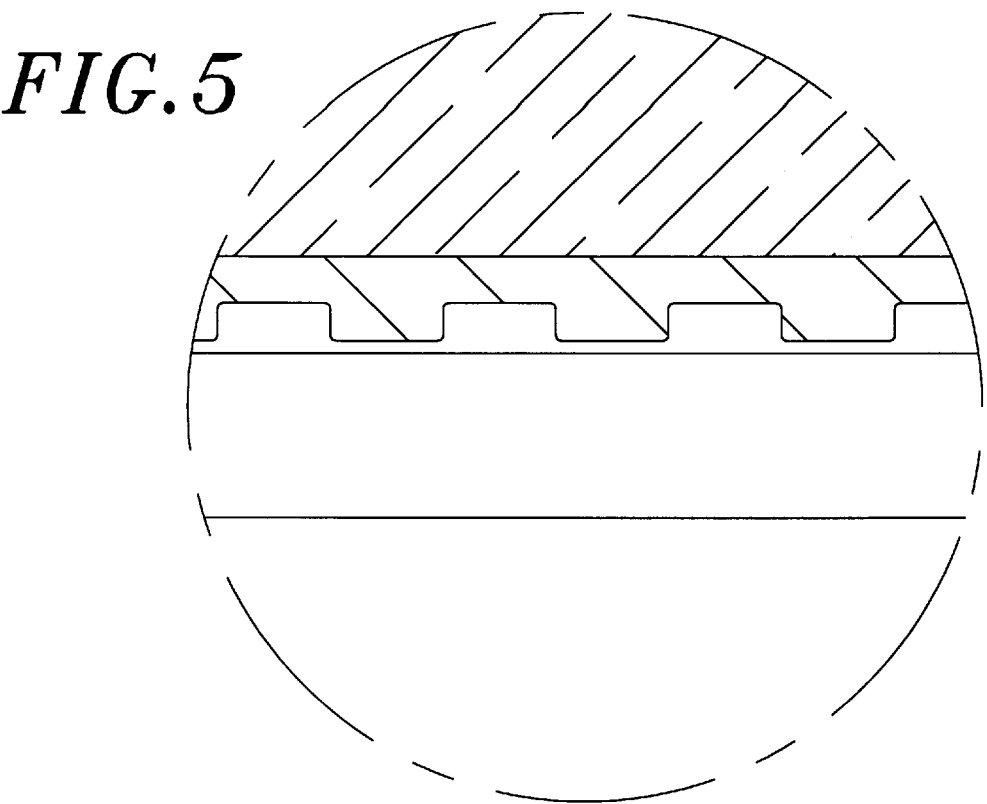
FIG. 5 shows a cross-sectional close-up side view of the edge of the assembly showing the relationship between the cartridge, pressurized housing, and rigid shell having a corrugated surface.
Figure 6:
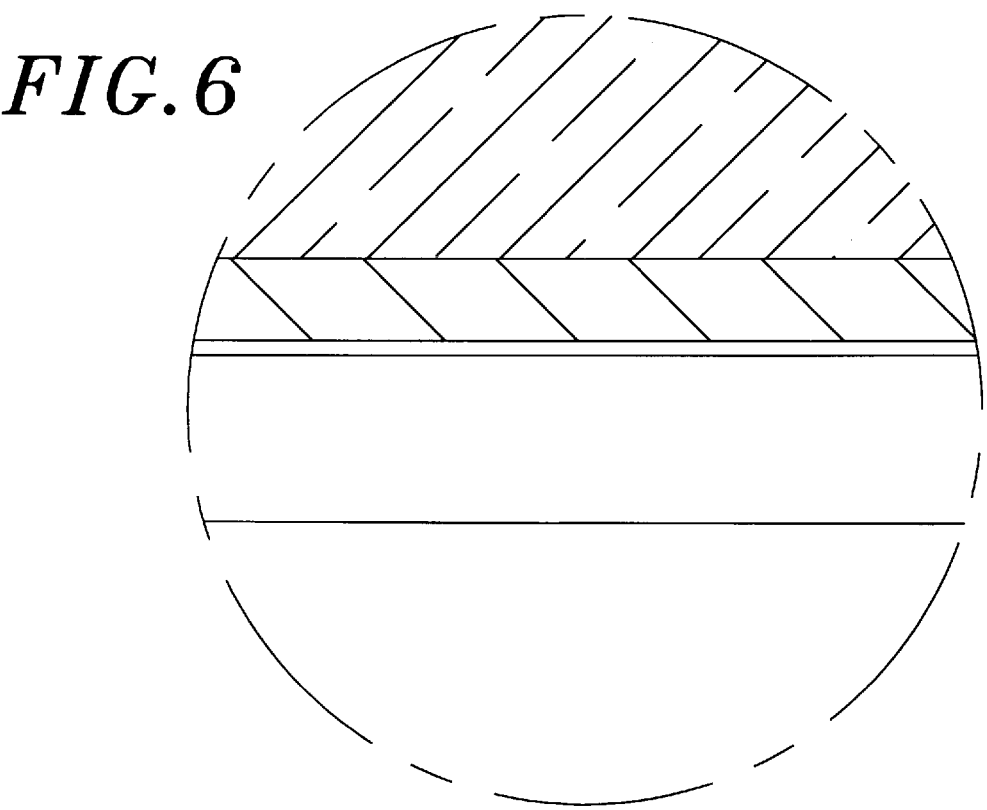
FIG. 6 shows a cross-sectional close-up side view of the edge of the assembly showing the relationship between the cartridge, pressurized housing, and rigid shell having a smooth surface.

While the surface of the shell in the described embodiment is threaded, it would also be possible to produce this shell with other textured surfaces. FIG. 5, for example, shows the same view as that of FIG. 4 of an alternate embodiment of the invention utilizing a shell with a corrugated surface. The purpose of the corrugated surface is to impart turbulence to the bypass flow. As the bypass flow travels through the annular space, the varying channel width created by the corrugated surface will create a turbulent flow and creates several annular, small orifices in series that creates higher differential pressure drop thus reducing the bypass flow. Any other surface texturing that produces a similar turbulence can be used with the current invention. FIG. 6 shows the same view as that of FIG. 4 of another alternate embodiment of the invention with a shell having a smooth and straight outer surface. With a smooth surface, the annular region between the shell and pressure housing must be very narrow to minimize bypass flow.

This invention can be used with any spiral wound membrane device employing a flat sheet membrane. For example, this invention can be used with membranes utilizing reverse osmosis (RO), nanofiltration (NF), ultrafiltration (UF), microfiltration (MF), gas separation, or pervaporation processes.

Membranes for RO, NF, UF, MF, gas separation, and pervaporation are well known in the prior art. Both anisotropic (asymmetric) membranes having a single and a double barrier layer (skin) and isotropic membranes are presently made in flat sheet form for RO, NF, UF, MF, gas filtration, and pervaporation (see e.g. U.S. Pat. Nos. 3,615,024; 3,597,393; and 3,567,632). The membranes may be of a single polymer or of a copolymer, laminated or of a composite structure wherein a thin barrier coating or film, charged or uncharged is formed over a thicker substrate film, the latter being either porous or non-porous (diffusional). The polymers suitable for such membranes range from the highly stable hydrophobic materials such as polyvinylidene fluoride, polysulfones, modified acrylic copolymers, polychloroethers and the like (normally used for UF, MF, gas filtration, and pervaporation and as substrates for RO and NF composites) to the hydrophilic polymers such as cellulose acetate and various polyamides (see, e.g. U.S. Pat. Nos. 4,399,035; 4,277,344; 3,951,815; 4,039,440; and 3,615,024).

In low pressure applications (e.g. 2–10 atmospheres) such as ultrafiltration, nanofiltration, microfiltration, and low pressure RO, the spiral wound element may be optionally mounted permanently in its own pressure container or cartridge having suitable fittings for connection to the filtration systems.

The rigid, nonporous shell should be manufactured within precise tolerances, but can be manufactured using any traditional method that provides such precise tolerances. For example, the shell may be extruded from a thermoplastic material, injection molded from a thermoplastic material, cast from a thermoset resin, or cast or extruded from metal. The outer surface texturing may likewise be machined from a variety of processes such as machining on a lathe.

It will be understood that the foregoing is merely illustrative of the principles of the invention, and that various modifications can be made by those skilled in the art without departing from the spirit and scope of the invention as defined by the following claims.

What is claimed is:

1. A fluid separation device which comprises;
   a rigid, nonporous shell comprising an interior surface and an exterior surface,
   a spiral wound membrane filtration element positioned inside the rigid, nonporous shell, and
   a pressure vessel enclosing the rigid, nonporous shell, the pressure vessel comprising an interior wall,
   the interior wall of the pressure vessel being disposed substantially near but spaced from the exterior surface of the rigid, nonporous shell thereby forming an annular space between the pressure vessel and the rigid, nonporous shell through which a fluid bypassing the filtration element can flow, a threaded groove running around the circumference and down the length of the exterior surface of the shell, the threads being spaced from the vessel.

2. The fluid separation device of claim 1 wherein the annular space is configured to permit 10% or less of incoming fluid to bypass the filtration element.

3. The fluid separation device of claim 1 wherein the annular space is configured to permit 5% or less of incoming fluid to bypass the filtration element.

4. The fluid separation device of claim 1 wherein the membrane filtration element utilizes a reverse osmosis process.

5. The fluid separation device of claim 1 wherein the membrane filtration element utilizes a nanofiltration process.

6. The fluid separation device of claim 1 wherein the membrane filtration element utilizes an ultrafiltration process.

7. The fluid separation device of claim 1 wherein the membrane filtration element utilizes a microfiltration process.

8. The fluid separation device of claim 1 wherein the membrane filtration element utilizes a pervaporation process.

9. A fluid separation device which comprises:
   a rigid, nonporous shell comprising an interior surface and an exterior surface,
   a spiral wound filtration element positioned inside the rigid, nonporous shell,
   a pressure vessel enclosing the rigid, nonporous shell, the pressure vessel comprising an interior wall,
   an annular space between the exterior surface of the rigid, nonporous shell and the interior wall of the pressure vessel through which a bypass fluid can flow, and
   a threaded groove running around the circumference and down the length of the exterior surface of the shell, the threads being spaced from the vessel.

10. A method for preventing stagnant areas of fluid from developing in a bypass fluid flow outside a spiral wound filtration element comprising the steps of:
    providing a rigid, nonporous shell surrounding the spiral wound filtration element,
    positioning the rigid, nonporous shell inside a pressure vessel to form an annular space between the shell and the vessel through which the bypass fluid can flow, and
    providing a threaded groove running around the circumference and down the length of an outer surface of the shell, the threads being spaced from the vessel.

11. A fluid separation device which comprises:
    a rigid, nonporous shell comprising an interior surface and an exterior surface, at least a portion of which exterior surface is textured,
    a spiral wound membrane filtration element positioned inside the rigid, nonporous shell,
    a pressure vessel enclosing the rigid, nonporous shell, the pressure vessel comprising an interior wall,
    the interior wall of the pressure vessel being disposed substantially near but spaced from the exterior surface of the rigid, nonporous shell thereby forming an annular space between the pressure vessel and the rigid, nonporous shell through which a fluid bypassing the filtration element can flow, the exterior textured surface having axially directed corrugation running around the circumference and down the length of the exterior surface of the shell, the corrugation being spaced from the vessel.

12. The fluid separation device of claim 1 wherein the membrane filtration element comprises an exterior substantially near the interior surface of the shell, and
    the fluid separation device further comprises a feed-brine spacer between the interior surface of the shell and the exterior of the membrane filtration element to eliminate potential fluid stagnancy on the interior of the shell.

13. A fluid separation device which comprises:
    a rigid, nonporous shell comprising an interior surface and an exterior textured surface, the exterior textured surface having positioned protrusions which impart turbulence to bypass flow,
    a spiral wound membrane filtration element positioned inside the rigid, nonporous shell,
    a pressure vessel enclosing the rigid, nonporous shell, the pressure vessel comprising an interior wall,
    the interior wall of the pressure vessel being disposed substantially near but spaced from the exterior textured surface of the rigid, nonporous shell thereby forming an annular space between the pressure vessel and the rigid, nonporous shell through which a fluid bypassing the filtration element can flow, in an undefined flow path, the positioned protrusions located around the circumference and down the length of the exterior surface of the shell, the protrusions being spaced from the vessel.

14. The fluid separation device of claim 13 wherein the exterior textured surface of the shell is corrugated.

15. The fluid separation device of claim 13 wherein the exterior textured surface of the shell is a random pattern that creates a turbulent flow and several orifices that reduces the bypass flow.

16. The fluid separation device of claim 13 wherein the exterior textured surface of the shell comprises a continuous helical channel extending from one end of the exterior surface of the shell to another end of the exterior surface.

17. The fluid separation device of claim 1 wherein there are no substantial obstructions at the entrance to the annular space.

18. The fluid separation device of claim 13 wherein the protrusions are randomly distributed.

19. The fluid separation device of claim 13 wherein the protrusions have top surface areas that are randomly sized.

* * * * *